US009068314B2

(12) United States Patent
Leifer

(10) Patent No.: US 9,068,314 B2
(45) Date of Patent: Jun. 30, 2015

(54) AREA BUBBLE PLUME OIL BARRIERS

(71) Applicant: Bubbleology Research International LLC, Solvang, CA (US)

(72) Inventor: Ira Leifer, Solvang, CA (US)

(73) Assignee: Bubbleology Research International LLC, Solvang, CA (US)

( * ) Notice: Subject to any disclaimer, the term of this patent is extended or adjusted under 35 U.S.C. 154(b) by 0 days.

(21) Appl. No.: 13/886,135

(22) Filed: May 2, 2013

(65) Prior Publication Data

US 2013/0294837 A1    Nov. 7, 2013

Related U.S. Application Data

(60) Provisional application No. 61/641,630, filed on May 2, 2012.

(51) Int. Cl.
*E02B 15/06* (2006.01)
*E02B 15/02* (2006.01)
(Continued)

(52) U.S. Cl.
CPC ............. *E02B 15/06* (2013.01); *E02B 15/02* (2013.01); *E02B 15/0814* (2013.01); *E02B 15/0835* (2013.01); *E02B 15/0842* (2013.01); *E02B 1/003* (2013.01)

(58) Field of Classification Search
CPC . E02B 15/0835; E02B 15/0842; E02B 1/003; E02B 15/02; E02B 15/06; E02B 15/0814; E02B 15/08; B01F 2003/04319; B01F 2003/04198; B01F 2003/04191; B01F 3/04113
USPC .............. 405/43, 45, 60, 62, 63, 64, 66, 67; 261/122.1; 210/170.05, 170.06, 210/170.09, 170.11, 241, 242.1, 242.2, 210/242.3, 747.5, 747.6, 923
See application file for complete search history.

(56) References Cited

U.S. PATENT DOCUMENTS 3,293,861 A * 12/1966 Hinde .............................. 405/61
3,491,023 A    1/1970 McCormick
(Continued)

OTHER PUBLICATIONS

Benjaminsen, C., "Fighting oil spills with bubble: Curtains of air bubbles are turning out to be a new method of fighting oil spill", Nov. 2011, http://www.ntnu.no/gemini/2011_autumn/10.htm.*
(Continued)

*Primary Examiner* — Sean Andrish
*Assistant Examiner* — Carib Oquendo
(74) *Attorney, Agent, or Firm* — SoCal IP Law Group LLP; Guy Cumberbatch; Steven C. Sereboff

(57) ABSTRACT

Systems and methods for barring the advance of an oil spill or for corralling such an oil spill. The systems provide area bubble plumes of air that remain coherent to reaching the surface, in contrast to previous bubble curtains under waves. The area bubble plume may be formed by parallel sparger elements that provide a wide plume of bubbles, and are suspended below the surface no more than 10 m. The sparger elements may be mounted in a matrix of structural support members. A series of discrete segments of the system can be connected together to form a flexible chain. The connected segments are desirably coiled around a spool on the rear end of a vessel for easy deployment. The sparger elements are tubular and made of the porous, resistive material that requires a greater luminal pressure than the exterior pressure to create fine bubbles.

20 Claims, 9 Drawing Sheets

(51) Int. Cl.
*E02B 15/08* (2006.01)
*E02B 1/00* (2006.01)

(56) References Cited

U.S. PATENT DOCUMENTS

| | | | |
|---|---|---|---|
| 3,593,526 A | | 7/1971 | Hoult |
| 3,651,646 A | * | 3/1972 | Grunau ............... 405/62 |
| 3,665,713 A | | 5/1972 | Rath |
| 3,744,254 A | | 7/1973 | Fennelly |
| 3,771,662 A | | 11/1973 | Muramatsu et al. |
| 4,320,989 A | * | 3/1982 | Mamo ............... 405/52 |
| 4,517,316 A | | 5/1985 | Mason |
| 4,616,055 A | | 10/1986 | Mason |
| 5,145,280 A | | 9/1992 | Araki et al. |
| 5,246,394 A | * | 9/1993 | Jensen ............... 441/133 |
| 5,299,885 A | | 4/1994 | Prassas et al. |
| 5,368,235 A | | 11/1994 | Drozdoff et al. |
| 5,811,164 A | | 9/1998 | Mitchell |
| 5,816,742 A | | 10/1998 | Cordewener |
| 5,971,660 A | | 10/1999 | Duchesneau et al. |
| 6,511,054 B1 | | 1/2003 | Green |
| 6,567,341 B2 | * | 5/2003 | Dreyer et al. ............... 367/1 |
| 8,132,794 B2 | | 3/2012 | Hinde |
| 8,162,297 B2 | * | 4/2012 | Norris et al. ............... 261/122.1 |
| 8,348,247 B2 | | 1/2013 | Hinde |
| 2003/0001291 A1 | * | 1/2003 | Stevens ............... 261/77 |
| 2011/0297621 A1 | | 12/2011 | Crouse |
| 2011/0303613 A1 | | 12/2011 | Crouse |

OTHER PUBLICATIONS

Brett M. Durham, Pneumatic Barrier for Oil Spill Containment, journal, accessed Feb. 12, 2012, http://www.rpi.edu/dept/chem-eng/Biotech-Environ/Environmental/boom.html.

Jen-Men Lo, The Effect of Air-Bubble Barriers in Containing Oil-Slick Movement, book, Ocean Engineering, vol. 24, Issue 7, Jul. 1997, pp. 645-663.

* cited by examiner

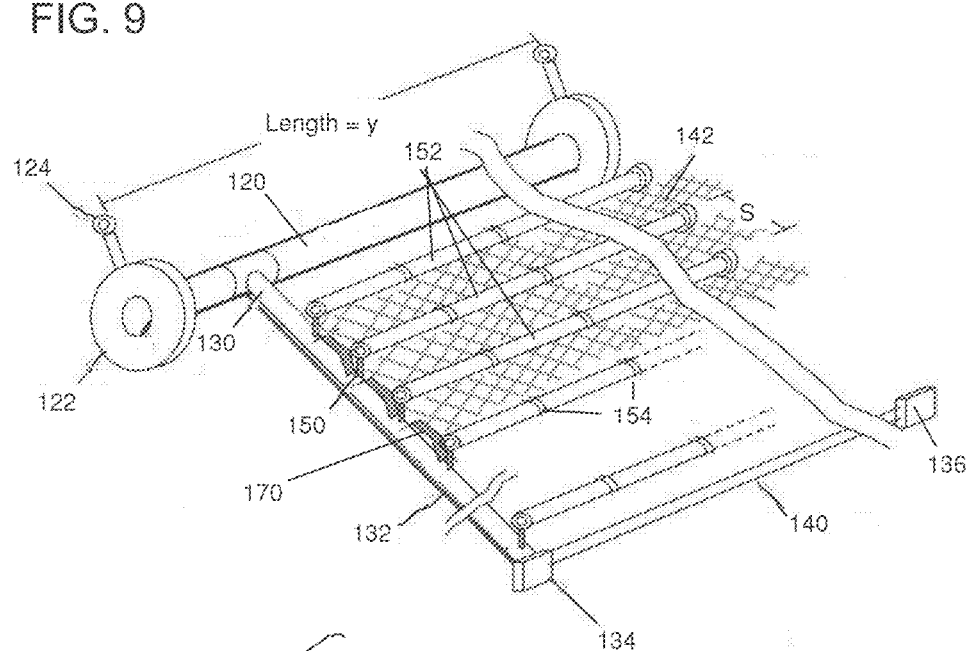
FIG. 9
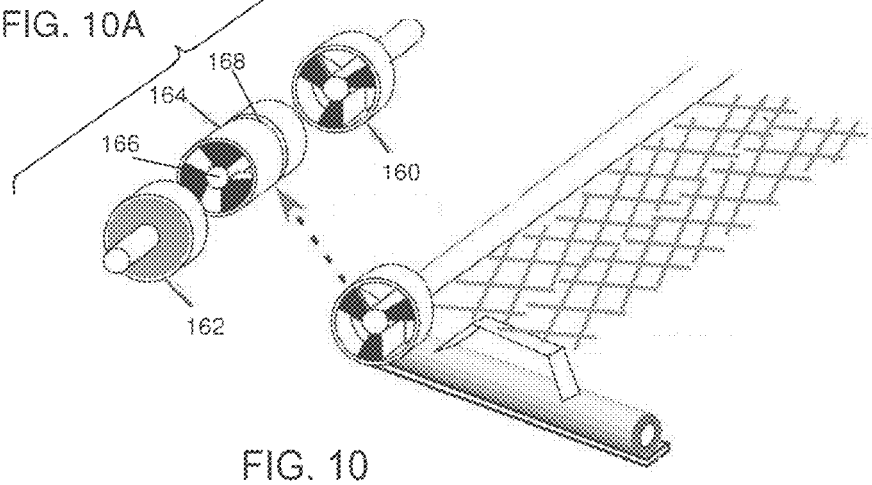
FIG. 10A
FIG. 10

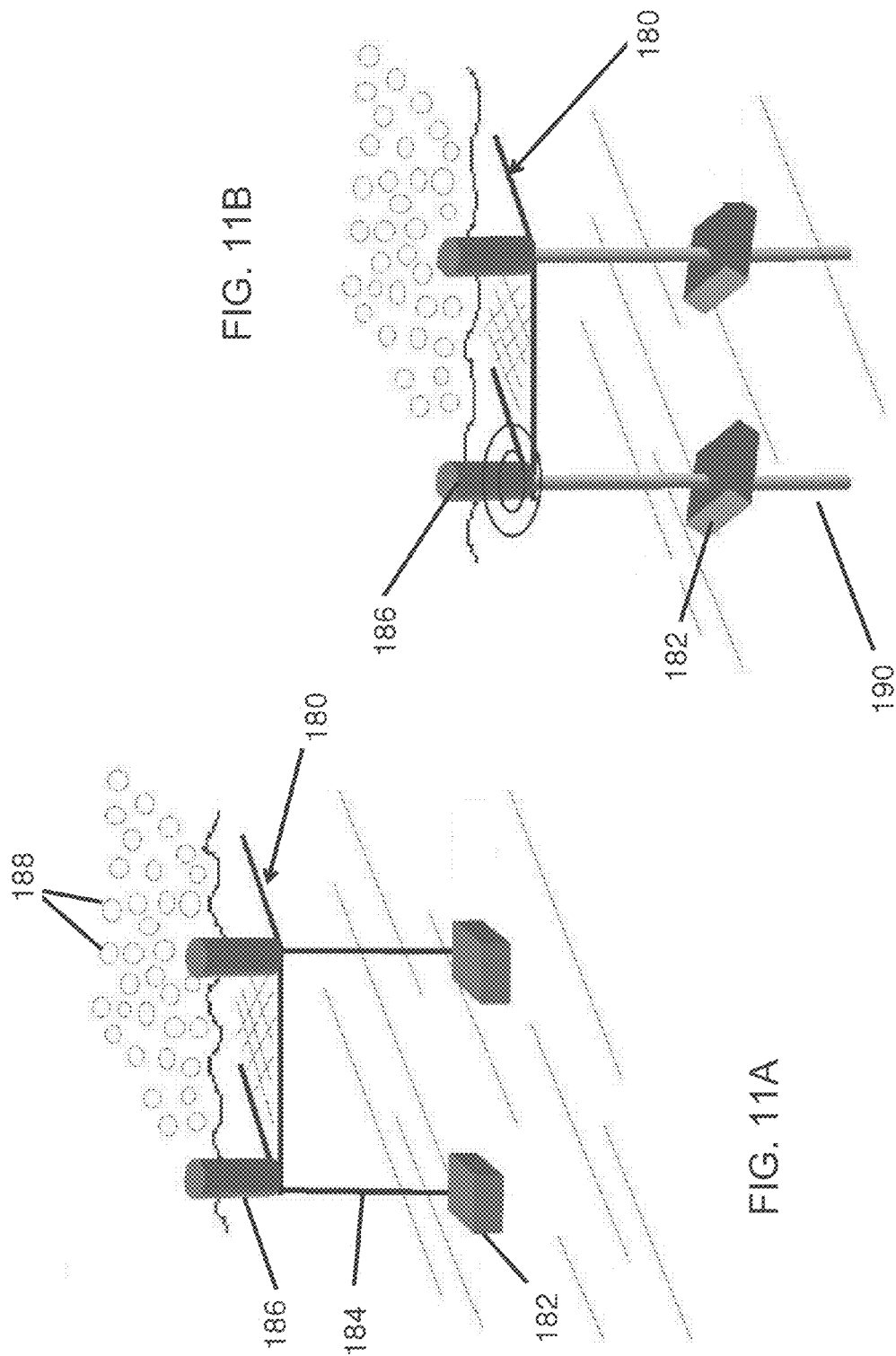

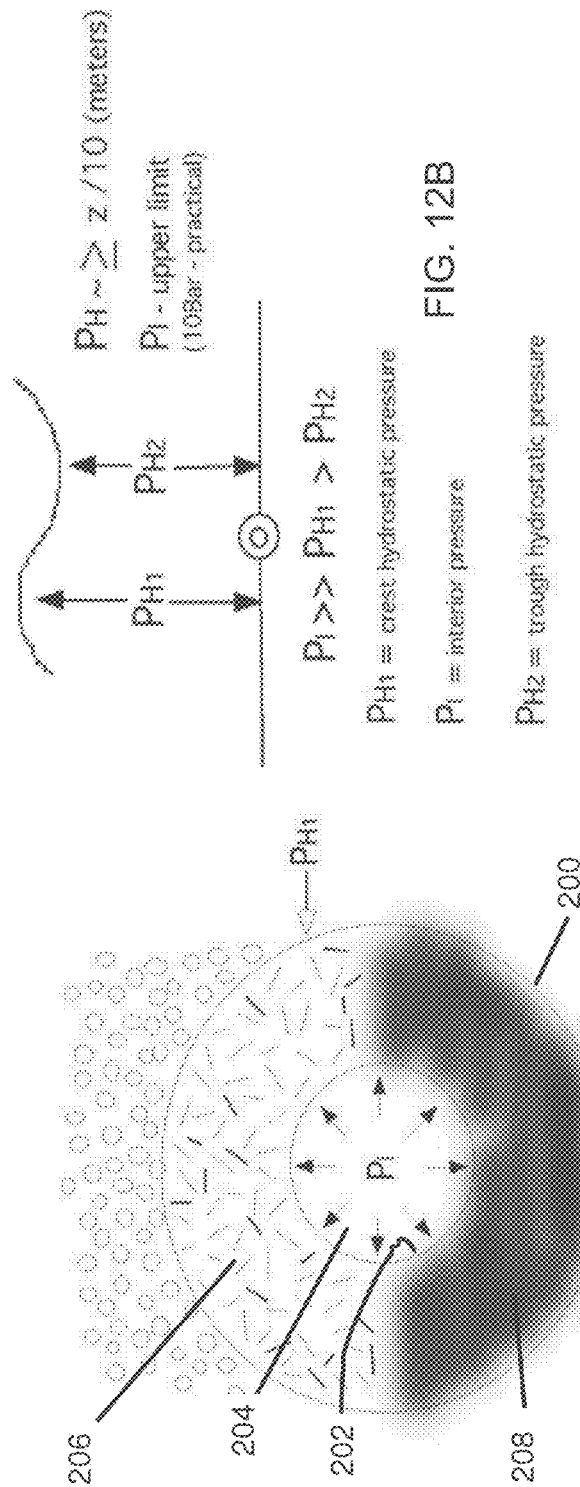
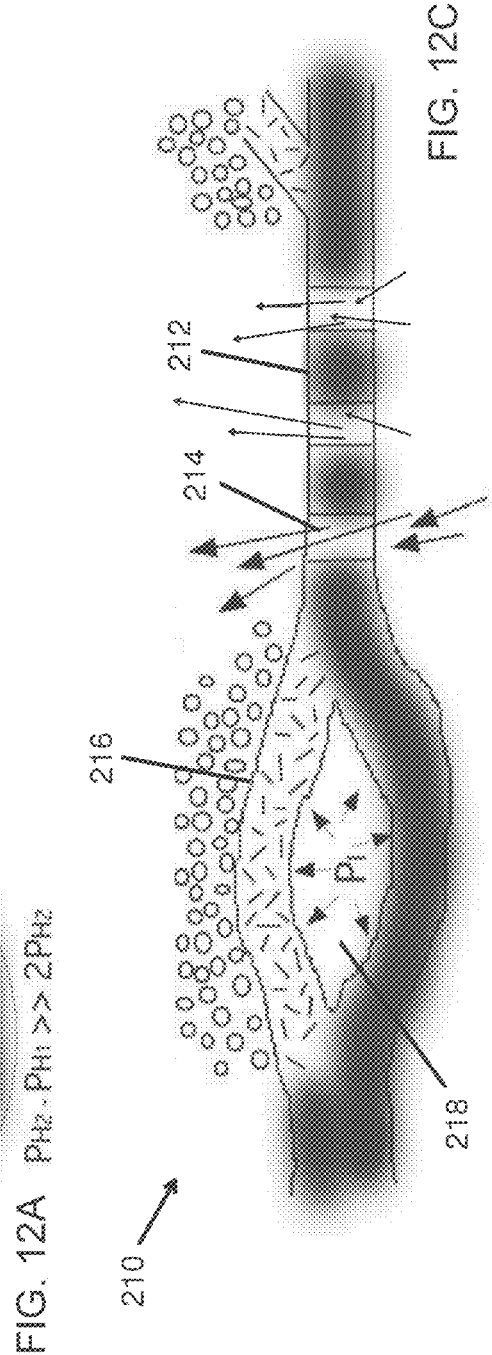
FIG. 12A   $P_{H2}, P_{H1} >> 2P_{H2}$
FIG. 12B
$P_H \sim \geq z/10$ (meters)
$P_L$ - upper limit (10Bar - practical)
$P_I >> P_{H1} > P_{H2}$
$P_{H1}$ = crest hydrostatic pressure
$P_I$ = interior pressure
$P_{H2}$ = trough hydrostatic pressure
FIG. 12C

US 9,068,314 B2

AREA BUBBLE PLUME OIL BARRIERS

RELATED APPLICATION INFORMATION

This patent claims priority from the following provisional patent applications: Provisional Patent Application No. 61/641,630, entitled PNEUMATIC OIL BARRIERS, filed May 2, 2012.

BACKGROUND

It is well recognized that combating oil spills in coastal waters is of great communal interest. This has led to continuous efforts to improve oil spill mitigation strategies. The preferred spill mitigation strategy often uses oil booms to contain and concentrate floating oil, prior to oil skimmer recovery. Despite improvements over the decades, limitations of tow speed and operation under real world conditions remain serious.

Conventional Oil Boom Leakage

A well-designed oil boom should be flexible to conform to wave motions, yet sufficiently rigid to retain as much oil as possible. Designs range from small, lightweight booms for manual harbor deployment, to large, robust booms for open sea use that need a crane and sizeable vessels to handle and deploy.

Important oil boom failure modes include overtopping where oil passes over the boom, and leakage where oil passes under the boom, surfacing as downstream oil patches. Boom overtopping mechanisms include overfilling, wave splashover, and boom-diving due to high towing speed. Boom leakage includes overfilling, frontal slick droplet injection (entrainment) from the confined pool, and boom-surfing due to opposing currents and/or winds blowing in the tow direction.

Oil pool thickness at the boom increases as more oil is collected and/or as the boom is towed faster. Overfilling often occurs with waves and current-induced boom diving and splashover. Leakage occurs when oil droplets are injected sufficiently deep to pass under the oil boom and is highly sensitive to towing speed. Once the towing velocity exceeds the boom's critical towing speed, the frontal wave 'breaks' on a large scale, increasing oil entrainment dramatically. Instability development and thus droplet injection increase strongly with towing speed.

Leakage also occurs for acute angle flows at boom-segment junctions from vortices formation. These vortices can inject oil into the water that then underpasses the boom. Acute angle boom flows occur on the leading boom segments that steer oil towards the apex.

Bubble Oil Boom Background

In 1971, the U.S. Coast Guard tested a pneumatic boom for oil spill control, otherwise known as a bubble oil boom (BOB) (US Coast Guard. Heavy-duty oil containment systems: pneumatic barrier system. Report 714102/A/094, US Coast Guard Office of Research and Development, Contract DOT-CG-00-490-A to Oil Containment Division, Wilson Industries, 1971). A pneumatic boom generally is formed from a long, submerged air pipe with a series of holes along its length, typically at the upper generatrix. The curtain of bubbles rise in a sheet that drives an upwelling flow, which at the water surface is converted (by continuity) into an outwelling, which is the oil-blocking barrier. The Coast Guard study concluded that BOBs only were useful for low currents such as harbors, where current commercial BOBs are found. A number of other attempts at using BOBs have been made, such as in U.S. Pat. Nos. 3,491,023, 3,744,254, and more recently U.S. Patent Publication No. 2011/0303613. However, to date there are no large-scale commercial BOB systems available outside harbors due a number of drawbacks with previous designs.

DESCRIPTION OF THE DRAWINGS

FIG. 9 is a perspective view of exemplary modular components of an area bubble plume system of the present application.

FIG. 10 is an enlarged view of one corner of one of the area bubble plume segments of FIG. 9, while FIG. 10A shows a flexible mating connection between segments.

FIGS. 11A and 11B are schematics views of configurations of area bubble plume systems that are anchored to a seabed.

FIG. 12A is a radial cross-section through an exemplary sparger element for creating air bubbles for the area bubble plume systems described herein.

FIG. 12B schematically illustrates differential pressures created by waves in and around the sparger elements.

FIG. 12C schematically illustrates a sectional view through an alternative bubble distributor showing sparger elements formed into a sheet or panel of homogeneous or otherwise similar material that also forms an open mesh between sparger elements.

DETAILED DESCRIPTION

Bubble Oil Boom (BOB) Design Principles

Figure 1A:
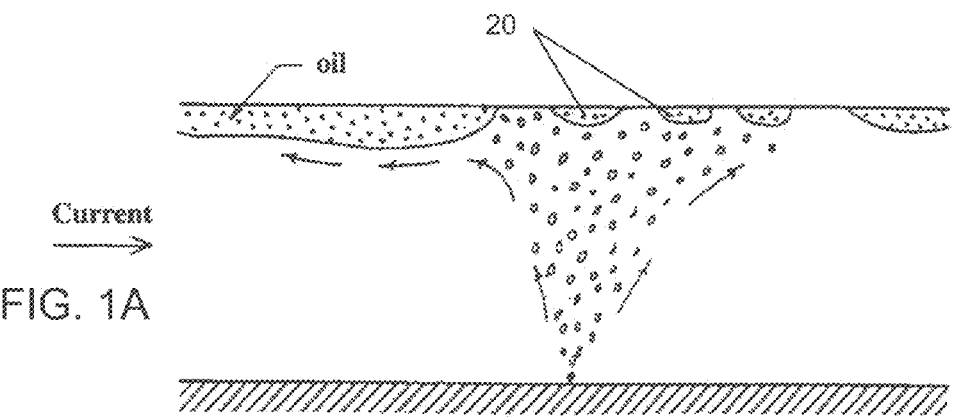
FIGS. 1A and 1B are two modes of failure for air-bubble barriers in containing oil slick movement.
Figure 1B:
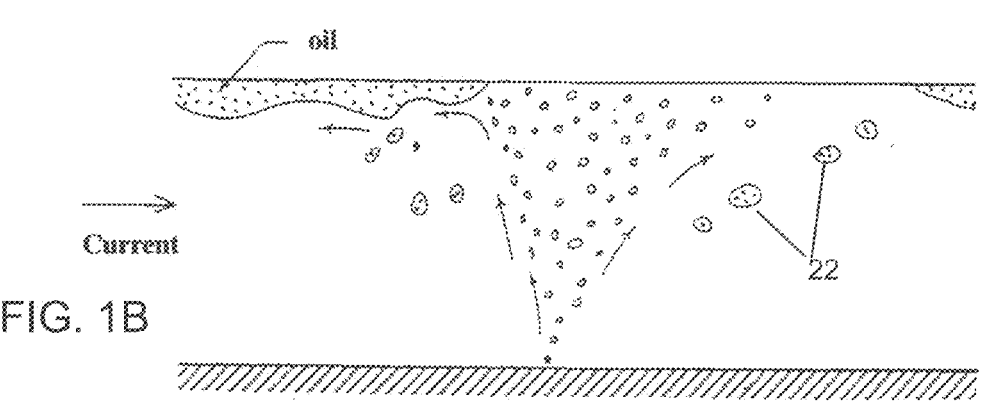

FIGS. 1A and 1B are two views of conditions which lead to failure for air-bubble barriers in containing oil slick movement. Counter-current failure as seen in FIG. 1A occurs when the air discharge is too low and is not sufficient to stop the advective current velocity of the oil layer at the water surface, leading to oil 20 passing over the bubble upwelling. Droplet shedding failure as seen in FIG. 1B may occur when increasing the air discharge rate to increase the counter-current at the surface. The increased circulation velocity leads to the entrainment of oil droplets 22 from the slick, which pass through the air-bubble barrier under the surface.

Figure 2:
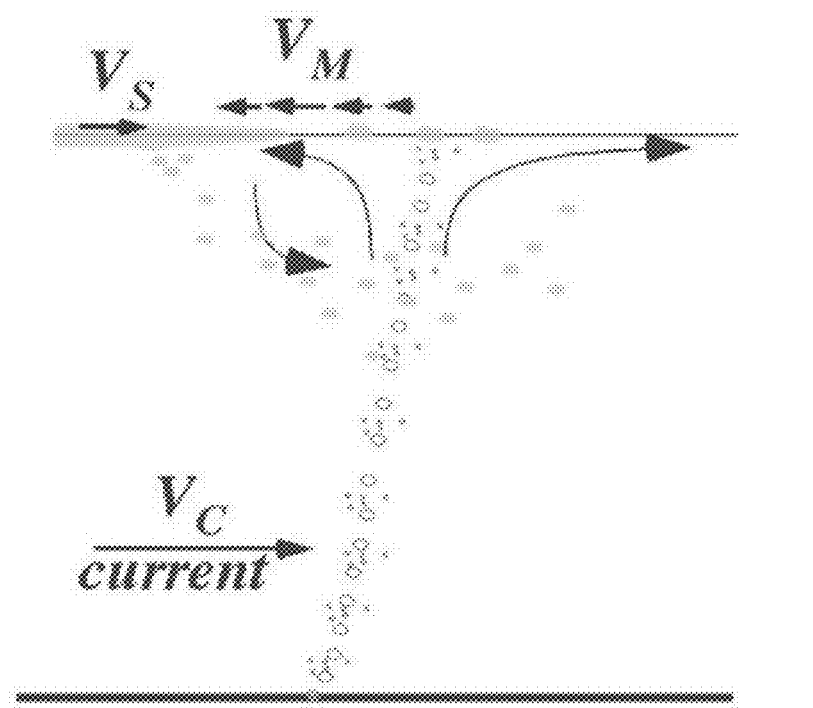
FIG. 2 shows two modes of bubble oil boom (BOB) failure, overrunning, and injection, leading to leakage.

With reference to FIG. 2, a BOB blocks oil if the maximum induced outwelling surface velocity, $V_M$, exceeds the oil's spreading velocity, $V_S$, which is a density current plus current or tow velocity, $V_C$. Towing is equivalent to a current in the boom's frame of reference. Due to interactions between the plume and ambient currents, $V_M$ also depends on the current $V_C$. The oil's spreading velocity is related to the oil pool thickness h as:

$$V_S \sim (h)^{1/2} \quad (1)$$

The oil pool thickness h depends on oil characteristics and increases with $V_C$, which concentrates the oil in a smaller area. Thus, overrunning for a BOB (FIG. 2), occurs when $V_S + V_C > V_M(V_C)$. Once oil breaches the location of the maximum outflow, $V_M$, typically just outside the plume surfacing location, the oil suppresses the outwelling flow and continues to overrun the BOB. Oil breaching is enhanced by turbulent fluctuations. Increasing the bubble flow increases $V_M$, which reduces overrunning. Unfortunately, increasing the bubble flow to prevent overrunning increases turbulence, internal waves, and bubble bursting leading to higher entrainment. Then, some fraction of the injected droplets drift into the bubble curtain and transit the bubble barrier (FIG. 2) due to turbulent eddy diffusive transport.

Insights from a marine upwelling study have stimulated a new bubble oil boom design. More particularly, a new bubble trawl approach for small copepod flotation was developed that used a towed area bubble plume. The bubble trawl concentrated copepods into a thin shallow near-surface layer. These field studies demonstrated that area bubble plumes exhibit processes distinct from point and line source bubble plumes. The term area bubble plume represents a bubble plume from a distributed source such as an array of air spargers, with a width to depth ratio that is close to unity. For blocking oil, the area bubble plume typically is longer than wider. A bubble curtain as described in the 1971 US Coast Guard study referenced above has a very small width to depth ratio; that is, it forms a long thin line source. In general, the general term Bubble Oil Boom (BOB) can be used with all bubble barriers, including early curtain systems, but the present application focuses on area bubble plume types of BOBs.

It is important to understand the physics of bubble oil barriers. Bubbles released underwater rise rapidly upward from their relative buoyancy. A plurality of bubbles rising together displaces the water in its path and tends to create an upwelling current of water. Once the bubbles reach the surface, they pop and disappear, while the upwelling current of water rises up a small amount before falling back due to gravity. The continual flow of water upward pushes the water that has already reached the surface outward perpendicular to the line of bubbles. In order to maintain a consistent and adequate upwelling of water, the plume of bubbles must remain relatively coherent and not meander from side to side in the current.

Figure 3:
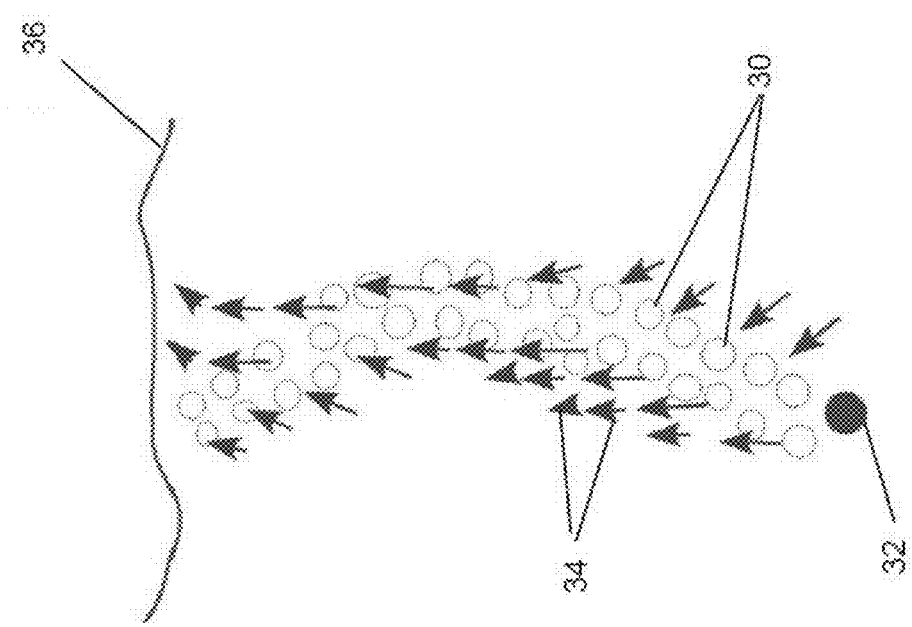
FIG. 3 graphically illustrates how waves and currents can misalign a bubble curtain and attendant upward fluid motion.

FIG. 3 graphically illustrates how waves and currents can misalign a thin bubble curtain, thus affecting the upward fluid motion. More particularly, the current of bubbles 30 emitted from a line source 32 meanders upward in a non-linear path due to the effect of wave and current motions. The attendant upwelling of water 34 created by the upwardly moving bubbles 30 does not necessarily follow the same path as the bubbles, and therefore loses momentum when the curtain of bubbles sways to one side or the other. The relatively non-coherent and changing flow arrows 34 indicate the upwelling of water breaking up and reforming as the bubble curtain moves from side to side. Instead of capturing the upward energy of the bubble curtain, the final energy of the water as it reaches the surface 36 is much reduced from what would occur in perfectly still water. Of course, the depth at which the line source 32 is positioned affects the coherency of the upwelling of water; the deeper the line source the less coherent the upwelling tends to be.

Figure 4:
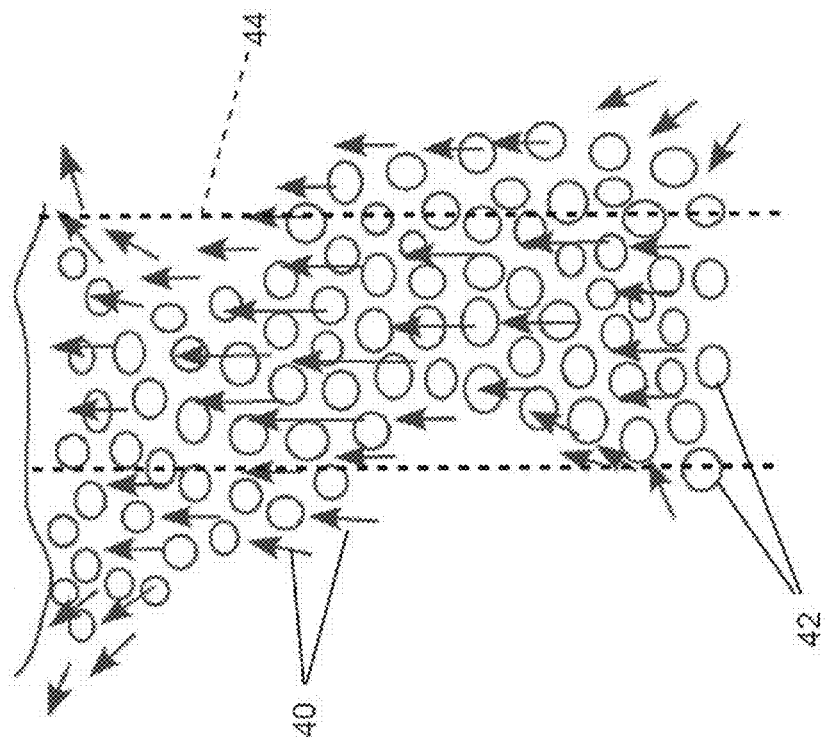
FIG. 4 schematically illustrates a wider upwelling created by an area bubble plume that ensures some bubbles are always aligned with some of the flow.

FIG. 4 schematically illustrates a wider upwelling of water 40 created by a bubble plume 42 some of which does not misalign. That is, although currents and wave action act on the bubble plume 42, its width relative to its depth is large enough to entrain a relatively wide upward current of water therein. The outer boundary of the bubble plume 42 meanders but an inner band continues upward, entraining water 40 as delineated by the continuous upward vertical arrows generally within the dashed lines 44. Of course, all bubble plumes are susceptible to dispersion if submerged deeply enough. That is, even a relatively wide bubble plume gradually converges to become a bubble curtain if submerged too deep. Accordingly, a good rule of thumb is that the width of the bubble plume should be approximately equal to its depth.

Observations in the Coal Oil Point (COP) seep field, a natural marine hydrocarbon seep field offshore Southern California suggest that large area bubble plumes can block oil. Here, extensive seabed oil and gas sources produce perennial oil slicks. Recent COP observations provided important insights on distributed bubble sources and their interaction with oil slicks on scales not reproducible in the laboratory. These oil slicks are herded and blocked by bubble-plume-induced outwelling flows, even in the presence of currents and waves. For example, area bubble plumes were observed blocking oil against winds up to 5-7 m s$^{-1}$ and swell of 1 to 2 m significant height (I. Leifer, Univ. of Calif., Santa Barbara, unpublished observations, 2008).

Area Bubble Plume at-Sea Tests

Real world testing of an area bubble plume-enhanced oil boom (tandem scheme) was conducted in the Coal Oil Point (COP) marine hydrocarbon seep field. Using a natural marine hydrocarbon seep field leverages its continuous and natural (no permit needed) oil emissions. For the field trials, calm weather and seas were chosen to facilitate bubble plume performance and failure visualization.

A dual bubble plume was produced from two 30-m sparger elements (porous rubber soaker hoses) that were mounted 30-cm distant from an oil boom and maintained by a series of floats at 30-cm depth. A regulated airflow was supplied from a compressor through an airflow manifold. The total oil boom length was 60 m so the tandem configuration extended from one of the support vessels to past the apex in a typical "J" configuration (such as described below with reference to FIG. 13). After deployment, the two support vessels slowly towed the oil boom, collecting natural seep oil, while a third vessel (7-m Boston Whaler) allowed observation of BOB performance.

The bubble plume outwelling flow easily diverted the oil slick away from the oil boom along the acutely-angled guiding boom sections with the slick thickened as it drifted along the boom. Vortex entrainment leakage was observed from the guiding boom segments in the absence of bubbles; however, the bubble plume kept the oil slick ~1 m from the oil boom, preventing vortex oil entrainment leakage.

Area bubble plume performance was challenged more strongly at the boom apex where the current was perpendicular to the oil boom, As the tow speed increased, the oil slick front moved closer to the bubble plume, eventually overrunning at ~0.7 ms$^{-1}$, ~40% higher tow speed than generally used for oil boom operations. As the tow speed approached the critical break-through speed, wave effects became important. The interaction between wave orbital motions and the organized bubble plume structures caused temporary weakening of small sections of the bubble plume. It was over these sections that the oil surged forward. Portions of the bubble plume that recovered too slowly allowed oil to over run it. Underwater observations indicated that the loss of bubble plume coherency was due in part to bubble plume disruption from waves. The wave orbital motions caused the plume to rise closer and then further from the oil boom between the wave troughs and crests, respectively. This led to a mismatch between the driving buoyancy flux and the upwelling flow, evidenced by offsets between the bubble surfacing location and the surface boil driven by fluid motions at the sea surface. Oil slick penetration was greatest at convergence zones between boils, prior to plume overrunning, and this was where the overrunning occurred first.

Once oil significantly overran a portion of the bubble plume, it suppressed the outwelling flow. This created a strong feedback effect that quenched the outwelling flow and thus the bubble plume no longer was able to block oil.

Underwater video showed that the area bubble plume blocked drifting, submerged oil from the upstream front and sinking oil from weathering.

In the field tests, overrunning tended to occur in convergence zones between boils, where the outwelling flow is less; thus, plume coherency was identified as playing an important role in efficient area bubble plume operation. Therefore, processes that decrease plume coherency like currents, waves and turbulence, decrease effectiveness. From an engineering point of view, a shallower bubble plume depth lessens disruptive processes (rise time is shorter); however, very shallow plumes still are in the acceleration phase and exhibit weaker upwelling flows, as well as allowing oil droplets to pass under the bubble source. However, laboratory data suggest the outwelling velocity profile rather than just the surface velocity is important to bubble plume oil retention, and thus additional plume acceleration is advantageous. Natural seep plumes are deep, but avoid these processes because of their extensive dimensions, suggesting compensation for increased depth by increased breadth.

Area Bubble Plume Advantages

There are a number of advantages for a wide area bubble oil boom versus a conventional oil boom. For example, an area bubble oil boom cannot exhibit boom planing and oversplashing since it does not have physical structure. There also is no physical boom that needs decontamination afterwards. Also, the rising bubble plume can block submerged oil, which a conventional boom cannot do. Again because of the lack of a surface floating structure, a bubble oil boom can be deployed amongst complex marine structures like docks. Finally, a wide-area bubble oil boom, which is effective in rougher seas, can be towed in areas with floating surface ice, unlike a physical boom.

Although the surface ice would impede somewhat the coherency of the upwelling flow, an underwater wide area bubble plume distributor can be towed underneath the ice and divert a significant quantity of oil. In contrast to the inability to even deploy a physical boom, such as capacity is a huge advantage.

Most conventional oil boom failure modes occur near the physical boom, so a tandem bubble plume and traditional boom application provide important synergies. Specifically, by maintaining the oil at a distance from the skirt, several leakage mechanisms can be reduced or eliminated, such as vortex oil leakage along leading boom skirts. Tandem application also enhances the bubble outflow by reflecting all the bubble-plume driven outflow from the clean water side of the bubble plume toward the oil-contaminated side.

Though the tandem arrangement seems technically challenging, field tests showed that a flexible arrangement of soaker hose sparger elements greatly facilitated deployment compared to inflexible arrangements (e.g., pipes with holes) that have been used previously. The flexible bubble distributor follow a surface waves better, maintaining source depth better. Because the bubble flow depends on the differential pressure across the bubble producing elements, variable depth (hydrostatic pressure) along the boom can lead to reduced airflow sections where oil overrunning would occur first. The field trial success (under calm conditions) further demonstrates the value of further field studies under less ideal marine conditions.

The observations and testing described above have led to a number of significant improvements in bubble oil boom technology, as described herein. In general, the width of the bubble plume from a predetermined depth should be sufficient to maintain a coherent upwelling of water so as to withstand wave and current motions. Furthermore, the quality of the bubbles generated is greatly improved by utilizing hollow tubes of a resistive porous media; that is, one that is made of a porous material through which air passes only when the internal lumen is over-pressurized. This leads to forming smaller bubbles that tend to entrain more water than when using perforated rigid tubes. Also, an elongated area bubble plume system can be created by joining together a series of individual panels or two-dimensional segments. Each of the segments is somewhat flexible, and the segments are flexibly connected to adjacent segments. The resulting chain of flexible segments is greatly adaptive to wave and current action. Also, the flexibility allows it to follow the wave surface so that the pressure difference between crest and trough is lessened (FIG. 12B). Additionally, specific construction advances enable the elongated chain of flexible segments to be easily deployed and supplied with adequate pressurized air.

Figure 5:
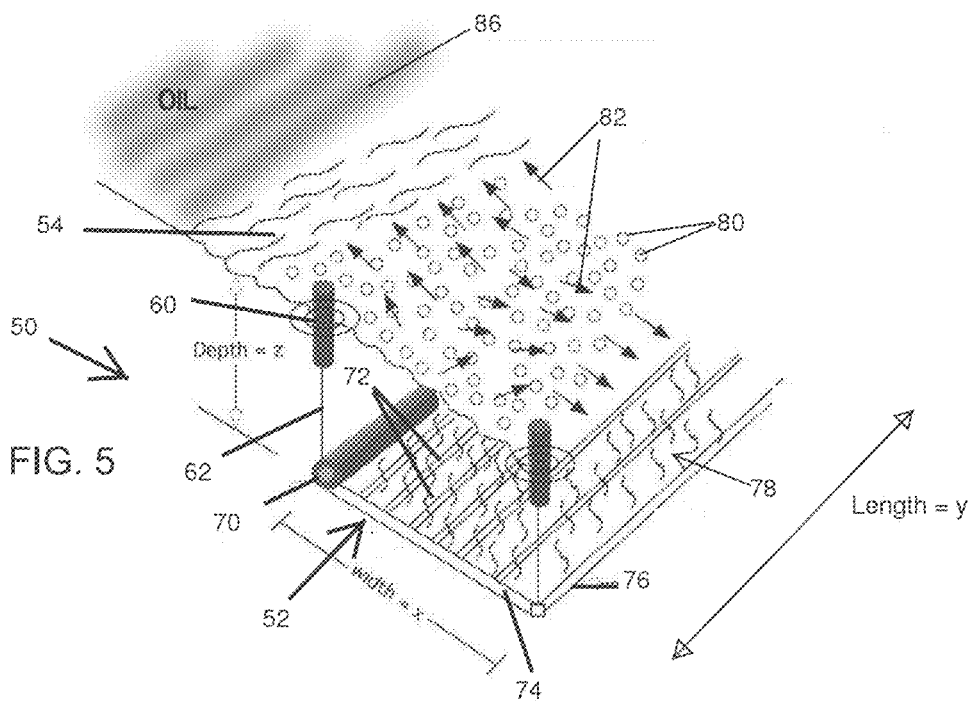
FIG. 5 is a perspective view of an area bubble plume system of the present application having a relatively wide bubble distributor suspended a predetermined depth below the water surface.

FIG. 5 shows an exemplary area bubble plume system 50 having a relatively wide bubble distributor 52 suspended a predetermined depth z below the water surface 54. Only a portion of one panel (two-dimensional segment) of the entire system 50 is shown to illustrate the basic concepts.

The bubble distributor 52 spans the boom width x and is suspended at the predetermined depth z by a plurality of buoys 60 connected thereto with tethers 62. If formed in segments, each segment extends longitudinally a length y. Depending on the shape and length of each segment, there could be four total buoys 60 at each rectangular corner, or additional buoys for differently-shaped or longer segments. Although not shown, a series of identical segments may be attached together to form a customizable length of the bubble plume system 50.

A primary air feeder line 70 extends along one lateral side of the bubble distributor 52. A series of laterally or longitudinally-oriented sparger elements 72 are evenly distributed across the width of the length of the distributor 52. "Sparger element" in this context means a tube or other such conduit capable of producing bubbles within water. Although a preferred sparger element as described herein is formed of a porous flexible foam-like material, certain aspects of the present application are applicable to other types of sparger elements, such as those made of fabric or even conventional perforated tubes, and thus the term should not be considered limiting.

A grid of lateral and longitudinal tension members 74, 76 connects to the primary air feeder line 70 and maintains even spacing between the sparger elements. The tension members at 74, 76 are desirably formed of a flexible lightweight bar-like material, such as polyethylene. A porous mesh or netting (not shown) extends between the tension members and 74, 76 to both maintain spacing of the sparger elements and permits flow-through of water, as indicated by the flow arrows 78.

In the illustrated embodiment, the sparger elements 72 are longitudinally oriented parallel to the primary air feeder line 70. In that configuration, a plurality of lateral secondary air feeder lines (not shown) extend from the primary feeder line 70 across the width of the distributor 52 so as to fluently communicate the interior lumens of the sparger elements 72 with the air supply line. Alternatively, the sparger elements 72 may be laterally-oriented with one end in direct communication with the primary air feeder line 70.

Figure 6:
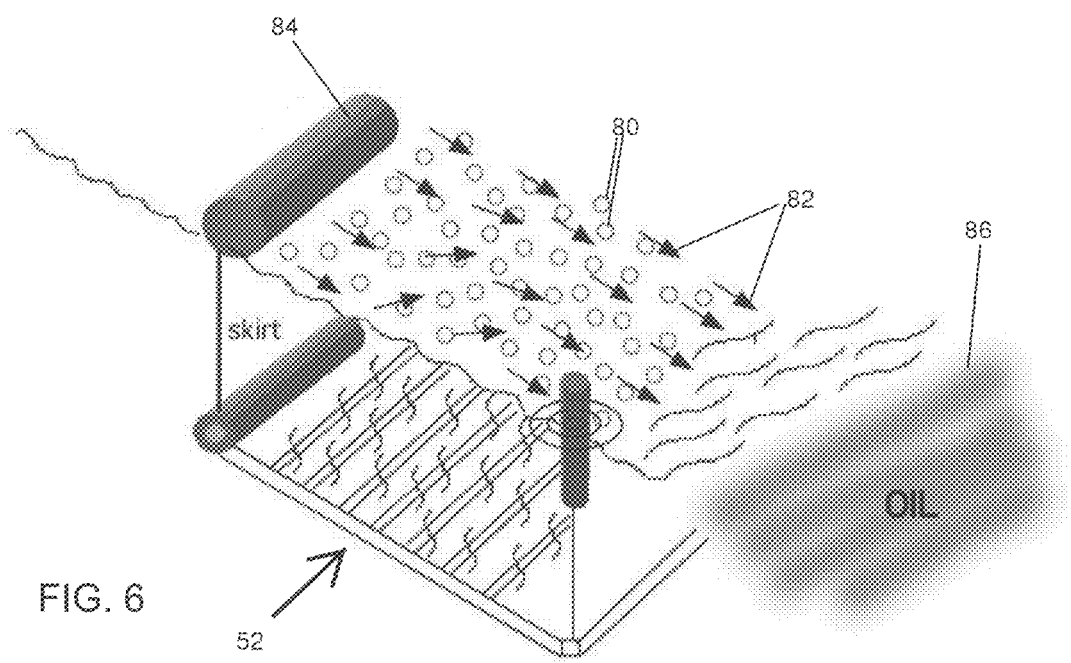
FIG. 6 is a perspective view of a further area bubble plume system having a wide bubble distributor suspended below the surface in conjunction with a conventional oil boom.

When in operation, as seen in FIGS. 5 and 6, the pressurized air introduced into the primary air feeder line 70 is directed to individual sparger elements 72. The resulting area bubble plume and upward flow of water is indicated at 78, with the bubbles coming to the surface at 80 and creating oppositely-directed outward flows of water 82. Due to the longer length, y, the outward flows of water 82 are in the width or x-direction. In the embodiment of FIG. 6, the bubble distributor 52 is used in conjunction with a conventional oil boom 84 which may be deployed directly above one lateral side thereof and provide structural support. In that case, the outward flow of water 82 from the bubble plume initially spreads outward until it reflects off of the boom 84, causing the entire out welling to flow away from the boom and toward a quantity of surface oil 86 (the oil slick). The bubble distributor 52 (and boom 84) therefore prevent the oil slick 86 from drifting over it. Furthermore, towing a length of the bubble distributor 52 between two boats, or behind one boat in conjunction with a submerged foil, permits active direction or collection of the surface oil 86.

As mentioned, a preferred sparger element 72 is formed of a tube defining a lumen and made of flexible, porous, resistive material that when submerged requires a lumen pressure significantly greater than the exterior pressure before gas will transit through the tube wall from the lumen to the exterior. The term "resistive" connotes the elastic nature of the material that closes the irregular pores therewithin in the absence of a luminal pressure, in contrast to perforated rigid pipes or porous ceramic bubblers, for example. One particularly useful off-the-shelf manifestation of a sparger element is a porous flexible garden soaker hose/tube/pipe manufactured primarily from recycled rubber as described in U.S. Pat. Nos. 6,511,054, 5,368,235, 5,299,885, 4,616,055, 4,517,316 (which are incorporated by reference herein). These products have in common the feature that they are manufactured with a multiplicity of small, irregularly shaped channels and pores that extend through the walls of the hoses. Gas escapes through these channels and pores into the liquid as bubbles, but water is substantially inhibited from entering the tube through these channels and pores when not pressurized. The resulting effect mimics gaseous bubbles that filter up through a muddy bottom for example.

Although the sparger elements may be formed using a commercially available porous water soaker hose, they may consist of any porous material that allows gas to escape when the luminal pressure exceeds a predetermined magnitude. The type and/or composition of the particular porous sparger element (whether a hose, tube, pipe or even sheet) is not critical for practicing the present invention as long as the aforementioned properties are retained. In one alternative, elongated membranes have a series of slits or duckbill valves can be used, such as those used for aerating aquaculture tanks, although such systems may be prohibitively expensive. However, the process is more efficient if the porous sparger elements produce a fine bubble pattern, as opposed to a coarse bubble pattern. In addition, certain aspects of the present application may work with conventional perforated pipe-type of bubblers, and thus the scope should not be considered limited unless done so by a particular claim.

Figure 7:
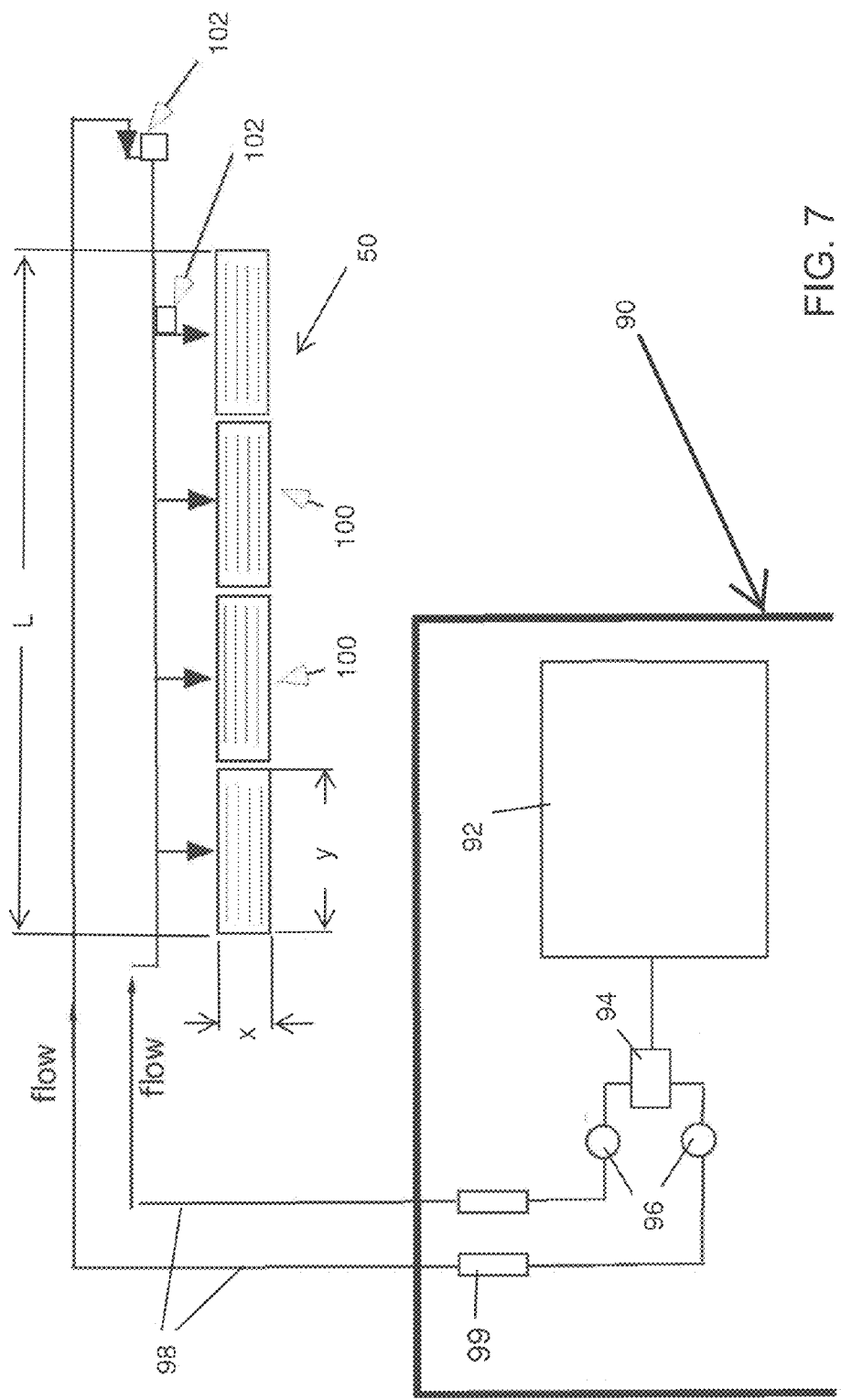
FIG. 7 is a schematic view of an air distribution network for use with the area bubble plume systems described herein.

FIG. 7 schematically illustrates an air distribution network for use with the area bubble plume system 50 being deployed off the stern of a boat 90. An electric or diesel compressor 92 pressurizes air flowing into a manifold 94 which distributes the flow evenly between two regulators 96. The regulators 96 equalize the flow in two feed lines 98, such as the primary feed line 70 shown in FIGS. 5 and 6. Flowmeters 99 provide feedback regarding the output from the regulators 96. The feed lines 98 extend the length L of the bubble plume system 50, which comprises a series of end-to-end connected segments 100. One or more check valves 102 may be included to prevent backflow and/or water entering the system.

Each of the segments 100 comprises a bubble distributor 52 as described above having a width x and a length y. Typically, each of the segments are modular and 100 has the same dimension as the others, although that is not necessary. In the illustrated embodiment, each of the segments 100 is rectangular looking downward in plan view, although that is not absolutely required, and the segment shape maybe arcuate, for example, so as to form a curved length of connected segments. In a preferred embodiment, the segments 100 are rectangular and submerged at a depth z of between about 0.5-4.0 meters, more preferably between 50 cm to 200 cm, but up to 10 m deep. The width x of each bubble distributor segment 100 should be about equal to its depth, and more preferably is between about 50-100% of the depth. The length y can vary between 2 to 15 times the width w, and preferably is between about 5-10 m, although it could extend to a typical maximum of 15 m. Practical widths of each segment could be up to 5-6 m.

Two air feed lines 98 are shown, preferably each one extending along either side of the connected segments 100. Providing two feed lines helps even out the air pressure distribution across the width of each of these segments 100, though a single air feed line 98 may be used, either along one side of the connected segments or underneath. As will be described below, each of the segments 100 are flexibly connected together to provide a series of flexibly linked segments, the number of which can be changed relatively easily.

Figure 8:
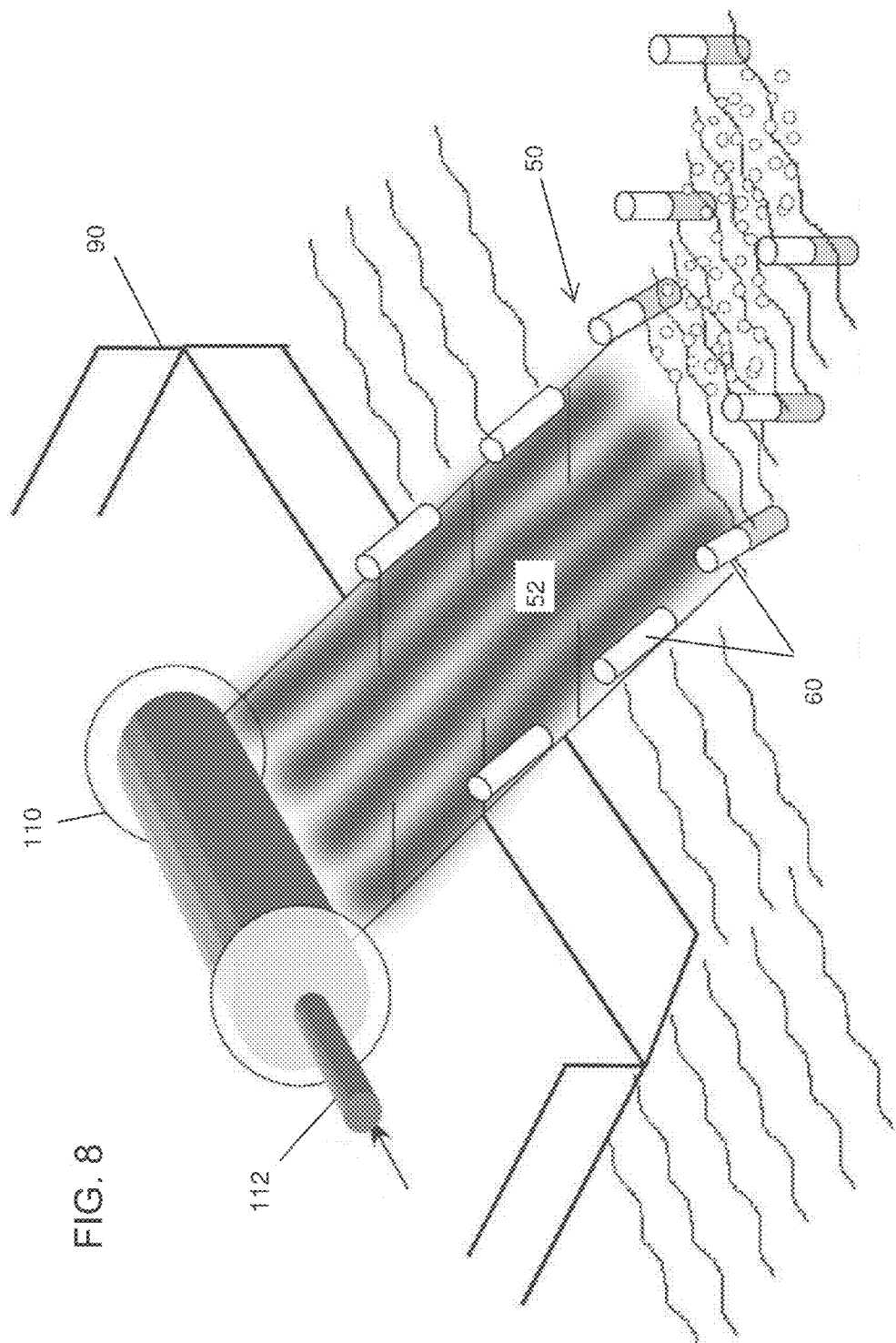
FIG. 8 schematically illustrates a wide bubble distributor being deployed off the stern of a boat.

FIG. 8 schematically illustrates deployment of an area bubble plume system 50 off the stern of a boat 90. A length of bubble distributor 52, or connected segments 100, are wound onto a large deployment spool 110 mounted for rotation at the boat's stern. The aforementioned buoys 60 and attachment tethers (not shown) are wound up with the two-dimensional bubble distributor 52. An air feed line 112 connects along the axis of the spool 110 and communicates with one or more air feed lines that extend the length of the bubble plume system 50. In this manner, the entire bubble plume system 50 may be easily deployed from the spool 110 and quickly placed into use whether or not the entire length has been unwound from the spool.

FIG. 9 is a more detailed perspective view of exemplary components of a segment 100 of an area bubble plume system 50. A primary air feeder 120 extends along one or both lateral sides (in the illustrated embodiment there is only one), and includes structural attachment rings 122 of between 2-4 inches in diameter on each end, each having an attachment point 124 such as a metal loop extending therefrom. Each segment 100 can therefore be manipulated by attaching tethers or cables or the like to or through the attachment points 124. In a preferred embodiment, the primary air feeder 120 has a diameter of about 3 inches.

At one end of the primary feeder 120, a secondary or lateral air feeder 130 extends across the width of the segment 100. A flexible stiffener 132, such as a polymer bar, extends alongside (preferably underneath) the lateral feeder 130 for support. The flexible stiffener 132 connects to a structural connector 134 which, in turn, physically anchors a tension member 140 oriented longitudinally, opposite the segment 100 from the primary feeder 120. The tension member 140, which can be a polymer bar or metal bar, for example, extends the length of the segment 100 to a secondary structural connector 136, which provides a junction for a second flexible stiffener 132 (not shown) that traverses laterally across the segment to the primary feeder 120. Finally, the entire structural skeleton of the segment 100 including the primary feeder 120, flexible stiffeners 132 and tension member 140 are coupled together with a relatively open mesh grid 142. The grid 142 is desirably made of a polymer, and defines openings between a latticework of connecting straps or ribbons of between about ½-1 inches in width. In the illustrated embodiment, the grid 142 comprises a diagonally crossed network of straps that define diamond-shaped openings having a larger dimension of between about 1-4 inches.

As mentioned above air enters the primary feeder 120 and travels across the width of the segment 100 in the lateral feeder 130. A series of ½-1 inch standoff pipes 150 extend vertically upward from the lateral feeder 130 and each communicates air flow to a longitudinally-oriented sparger element 152. The sparger elements 152 extend the length of the segment 100, and are preferably secured to the open mesh grid 142 using a plurality of cable ties 154, for example at 12 inch intervals. The number and spacing of the sparger elements 152 may vary, though an exemplary embodiment has sparger elements 152 spaced a distance S of about 3-6 inches apart. Additionally, although one lateral air feeder 130 shown on one end of the segment 100, a second lateral feeder (not shown) may be included to ensure adequate airflow through the porous material along the entire length of the sparger elements 152. If the second lateral air feeder is provided, a second series of vertical standouts are also provided communicating with the sparger elements 154. The sparger elements desirably have internal diameters of between about 0.50-1.50 inches (1.27-3.81 cm).

FIG. 10 is an enlarged view of one corner of one of the area bubble plume segments 100 of FIG. 9, while FIG. 10A shows a flexible connection between segments. More particularly, each segment 100 has a finite length of primary air feeder 120 that terminates in a coupler element 160. FIG. 10A shows a similar coupler element 162 that would be attached to the end of a primary air feeder line on an adjacent segment. A universal coupler 164 joins the coupler elements 160, 162. For example, the coupler elements 160, 162 may be female versions, while the universal coupler 164 has male counterparts. The universal coupler 164 provides a central through passage 166 for air and seals water tight with each of the coupler elements 160, 162, while providing a sealed rotational junction 168 (e.g., a ball joint) at its mid-plane. In this manner, airflow can be communicated between adjacent segments 100 while permitting the segments to flex and rotate with respect to one another. Of course other structural connections between the segments may also be provided, such as between adjacent flexible stiffeners 132.

It should be noted that the highly flexible connections between the segments 100, as well as the flexible nature of the segments themselves allows the entire bubble distributor 50 to flex up and down along with the sinusoidal action of ocean waves. As is made clear in the diagram in FIG. 12, the pressure just under the surface fluctuates with the waves and thus this highly flexible system helps maintain the sparger elements 152 in an undulating isobaric plane. This helps even out the production of bubbles along the entire bubble distributor 50, thus reducing discontinuities and possible areas of oil breakthrough.

In a preferred embodiment, the open mesh grid 142 is elevated to a level just below the sparger elements 152 by a plurality of support risers 170 mounted along the flexible stiffeners 132. As illustrated, the support risers 170 may comprise short arched or bridge-like rigid members that span the distance between the spaced standoff pipes 150, and having approximately the same height as the standoff pipes. The mesh grid 142 is secured to the top span of each of the support risers 170, and is also held just below the sparger elements 152 by the intermittent cable ties 154.

In FIGS. 11A and 11B, an area bubble plume system having a bubble distributor 180 is shown anchored to a seabed with a pair of weights 182. The bubble distributor 180 is connected to the weights 182 with rigid or flexible tethers 184, and is held suspended at a predetermined depth by plurality of buoys 186. The area bubble plume 188 functions in a manner as described above, and the more permanent anchored arrangement can be situated around the potential source of an oil spill, such as a drilling platform or an off-loading tanker.

FIG. 11B illustrates another version of a semi-permanent area bubble plume system similar to the system in FIG. 11A, but the weights 182 are connected to the bubble distributor 180 with a number of hollow pipes 190. In this arrangement, if the weights 182 begin to work themselves into the sand over time, and removal of the system is required, air or other gas can be injected through the hollow pipes 190 so as to fluidize the seabed S in the area in and around the weights 182. After a short period of injecting air, the weights 182 can be dislodged from the seabed.

FIG. 12A is a radial cross-section through an exemplary sparger element for creating air bubbles for the area bubble plume systems. The porous material is desirably formed into elongated tubes having a cylindrical outer surface 200 and a cylindrical inner surface 202 circumscribing a lumen 204. The internal pressure $P_I$ within the lumen 204 must be greater than the external hydrostatic pressure $P_{H1}$ for air to transit across the thickness between the inner surface 202 in the outer surface 204. More particularly, as seen by the inequalities in FIG. 12B, the internal pressure $P_I$ should be substantially greater than the external hydrostatic pressure $P_{H1}$ experienced when an ocean wave above crests. The crest hydrostatic pressure $P_{H1}$ is greater than the drop hydrostatic pressure $P_{H2}$. As indicated, the practical upper limit of the internal pressure $P_I$ is about 10 Bar.

A preferred configuration of sparger element shown in FIG. 12A comprises an upper porous half 206 and a lower non-porous half 208. Providing the tubular sparger element to have just its upper half 206 porous means that bubbles will only be emitted upward, and not downward. This configuration improves the efficiency of the system because bubbles that are emitted on the lower side tend to come out more slowly and thus the work done by the pressurized air is concentrated on the upper half 206. The lower half 208 can be made non-porous during the fabrication process by neglecting to mix air into the un-cured material on outside, or the lower half 208 can be sealed with an outer coating or impregnated with a compatible polymer that fills its pores.

FIG. 12C shows how the exemplary sparger elements can be highly deformed yet still produce an upwelling of bubbles. In particular, the initially tubular shape of the sparger element may be flattened significantly from wave action or other environmental pressures while still maintaining a lumen 204 and pressure differential to create the bubble plume.

FIG. 12C also illustrates an alternative construction for the bubble distributors described herein. Namely, instead of having separate tubular members as sparger elements that are connected to an open mesh grid, the entire structure can be fabricated as one unit or panel out of the same or a similar material. The alternative bubble distributor 210 includes a flat section 212 with many flow-through holes 214 that forms the open mesh grid. In between these flat sections 212, sparger elements 216 are created by dual-layer areas of the material. The sparger elements are thus not exactly tubes, and instead form a more lenticular shape with a lumen 218 that can be pressurized with air. Again, the lower half is preferably non-porous, while the upper half is porous and produces bubbles.

The "single unit" bubble distributor 210 has a lower vertical profile and less rigidity, and thus flattens better and can be rolled up into smaller coils. The material can be the same as was described above, or other materials such as fabric (e.g., Gore-Tex) may be utilized. If the material is a porous rubber as used in soaker hoses, reinforcing fibers can be embedded within the structure for tensile strength. As in the earlier described embodiment, however, the alternative bubble distributor 210 may be fabricated in discrete segments that can be connected together, or may be fabricated in one long strip with intermittent lateral openings for connection to a primary air feeder tube.

Figure 13:
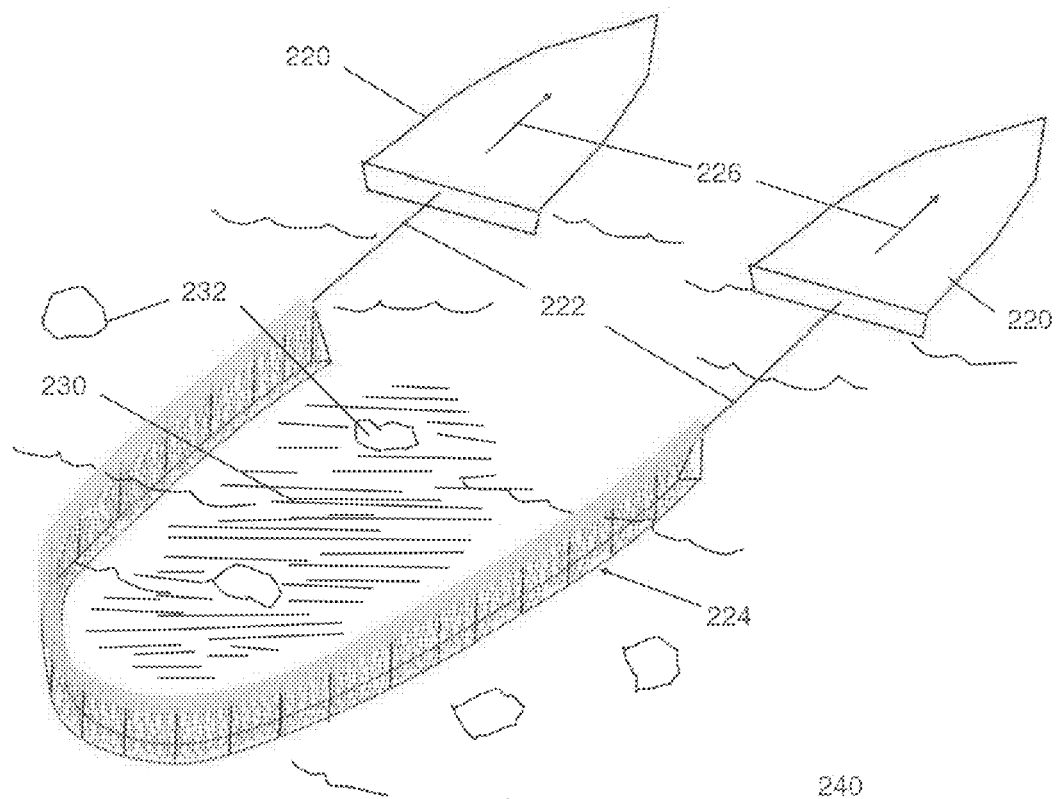
FIG. 13 shows a dual boat boom deployment, where the arrows show the tow direction.

FIG. 13 shows a dual boat boom deployment, wherein two boats 220 each trail a tether or cable 222 which connects to a free end of an elongated area bubble plume system 224. The arrows 226 on each boat 220 show the tow direction. The area bubble plume system 224 defines an enlarged U-shape the open end of which can be towed over and capture an oil spill 230, that can be gradually be displaced. The curvature of the U so formed may not be to scale, but the flexibility of the connected segments as described above enable such a shape. A series of ice chunks 232 are illustrated to emphasize advantages of the present area bubble plume system 224 over conventional solid oil booms. That is, the area bubble plume system 224 can function even in ice-infested waters as the upwelling bubble plume passes around each one of the ice chunks 232 rather than collecting them as would a typical boom. The bubble oil boom can be deployed as shown with or without a conventional oil boom, although not the latter for ice-infested waters. In one embodiment, the two boats 220 are spaced apart between 500 feet to 1 mile, and the length of the system including the cables 222 and bubble plume system 224 is proportionate.

Figure 14:
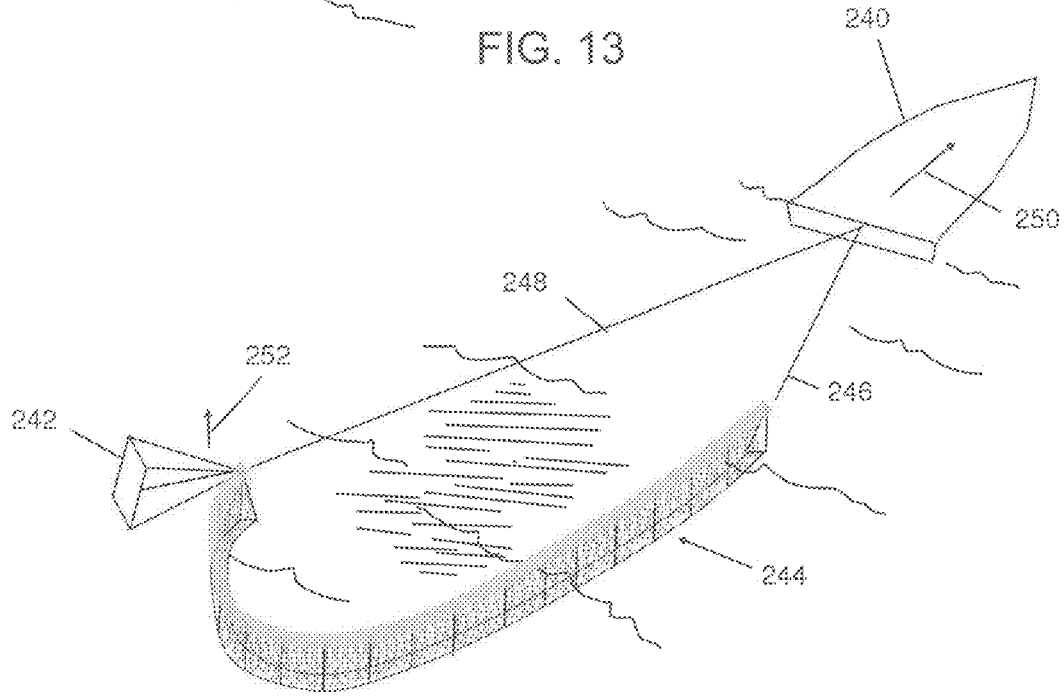
FIG. 14 schematically shows a single boat boom deployment utilizing a "kite" or "door" or similar subsurface structure to divert laterally one end of the boom.

FIG. 14 schematically shows a single boat 240 deployment utilizing a "kite" or "door," or a subsurface diverter 242 to laterally shift one end of the area bubble plume system 244. A short cable 246 from the back of the boat 240 connects to one free end of the plume system 244, while a longer tether 248 connects to the other free end at which is positioned the kite or subsurface foil 242. Again, the arrow 250 on the boat 240 indicates the overall direction of travel of the system, while the small arrow 252 on the kite or subsurface foil 242 shows how the second free end of the plume system 244 is pulled laterally to create a generally J-shaped boom.

In addition to movable area bubble plume systems, they may be anchored to the sea floor as described above, or deployed as a stationary barrier against encroaching oil. For instance, a long line of segments may be rapidly deployed across the mouth of a harbor to prevent ingress of an oncoming oil slick moving with the current while allowing vessels to pass over. Alternatively, a disabled oil tanker or other such vessel leaking oil may be surrounded by the area bubble plume systems described herein to contain the spill.

Based on the foregoing, certain preferences or options are apparent, as explained below.

A. Bubble Production for Oil Spill Control from a Shallow Area Bubble Plume

A broad, shallow bubble plume allows effective control of surface oil in marine and lake (non-harbor/calm) environments where broad is relative to depth (i.e. comparable) and application depends on wave characteristics. A broad bubble plume is critical to avoid fluid momentum/bubble misalignment due to currents and waves. Typical application depths may be from 0.5-4 meters, more preferably between 50 cm to 200 cm.

B. Bubble Production Through a Porous Matrix (Tube)

The use of a porous, flexible matrix for bubble production in marine and fresh water allows for maintaining a significant interior/exterior pressure. This prevents small changes in hydrostatic pressure from causing waves, etc, from significant bubble production rate changes. Flexibility allows the matrix to better follow wave surfaces, optimizing bubble production against variations driven by varying exterior hydrostatic pressure from waves, towing, etc. Porous ceramic material will break in a marine environment.

The porous matrix enables complete spatial bubble production coverage and uniform bubble production rate over long lengths (compared to a system with low interior-exterior pressure differential). Providing sparger elements that only emit bubbles on their upper halves helps improve efficiency of the entire system.

The porous matrix produces a uniform bubble size to ensure the generated upwelling flow does not vary spatially due to bubble size.

C. Adjustable, Multiple-Element, Bubble Production for Plume Homogenization

Individual sparger elements can be activated or deactivated with a series of patterns to allow sparger spacing at integer times the minimum tube spacing. This spacing flexibility between sparger elements allows for different settings to ensure plume homogenization before the bubble plume reaches the water surface over a range of depths.

D. Bubble Production Through a Porous Matrix (Sheet)

For system deployability, the tubular elements are produced as a segmented, seamless unit or sheet that incorporates bubble sparger elements, air delivery elements, and structural elements including netting/webbing that allows vertical fluid flow through the boom source. Entire sheet bubble oil boom is "roll" deployed from a large drum.

E. Flexible Stiffener System for Optimizing Matrix Depth and Horizontal Position To maintain bubble element position (to ensure bubble plume homogenization) a flexible netting matrix is used to allow fluid upwelling flow between elements, and to prevent element "surfing," which can narrow the plume, or cause depth variability and oscillations. The netting incorporates flexible stiffener elements to prevent collapse.

F. Multiple Air Feeder System for Porous Matrix Bubble Production

To supply air to long lengths of broad bubble oil boom, air supply is through multiple feedpoints to ensure maximum pressure drop between feedpoints remains above critical need to ensure even bubble production. System incorporates a large bore air supply line with multiple lines in a branchiated pattern.

G. Entire Bubble Air Production System from a Single Material

Sheet production elements rather than tube production elements allows individual sparger element plumes to have a broad source, improving vertical plume homogenization.

H. Mechanism for Attaching a Bubble Oil Boom to a Conventional Oil Boom

I. Seabed Attachment for a Bubble Oil Boom for Surf Zone Deployment

Fixed attachment anchors are deployed at the seabed in the surf zone to provide fixed attachment points for the bubble oil boom and air supply system. Anchors work into sand due to surf motions. Diversion of air supply into anchors will fluidize sand to free anchors for retrieval.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to methods, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A wide area bubble plume system for controlling oil floating on a surface of a body of water, comprising:
    (i) a bubble distributor including at least three connected two-dimensional flexible sheet-like segments, each segment having a series of sparger elements distributed across the segment so as to produce bubbles across a width of at least 0.5 m, the segments being flexibly connected together at adjacent longitudinal ends and each having a primary air feeder line and a coupler element at both ends thereof in fluid communication with the coupler elements on primary air feeder line(s) of the adjacent segment(s); and
    (ii) buoyant elements connected via tethers to each of the bubble distributor segments adopted to float on the surface of a body of water and maintain the segments at a predetermined subsurface depth.

2. The system of claim 1, wherein each primary air feeder line extends longitudinally along one lateral side of the segment and has a flexible connection to another primary air feeder line on adjacent segment(s), to accommodate flexing of the connected segments with respect to one another.

3. The system of claim 2, wherein each of the segments further includes at least one secondary air feeder line extending laterally across the width of the segment and being in fluid communication with each of the series of sparger elements that are oriented longitudinally.

4. The system of claim 1, further including an open mesh connecting the series of sparger elements together and maintaining their relative positioning.

5. The system of claim 1, wherein each of the sparger elements comprises a tube defining a lumen and made of flexible, porous, resistive material that when submerged requires a lumen pressure greater than an exterior pressure before gas will transit through the tube wall from the lumen to the exterior.

6. The system of claim 1, wherein the segments are wound about a spool prior to deployment.

7. The system of claim 6, wherein the spool includes an airflow inlet along its axis for communicating with the primary air feeder lines of the connected segments.

8. A wide area bubble plume system for controlling oil floating on a surface of a body of water, comprising:
    (i) a bubble distributor including a plurality of sparger elements each formed of dual layers of material having parallel regions attached to define a lumen and at least one layer of the material being made of flexible, porous, resistive material that when submerged requires a lumen pressure greater than an exterior pressure before gas will transit through the at least one layer from the lumen to the exterior, the sparger elements being joined by a flexible grid having open flow-through holes to form a flexible flat panel that may undulate in ocean waves; and
    (ii) buoyant elements connected via tethers to the bubble distributor adapted to float on the surface of a body of water and maintain the bubble distributor at a predetermined subsurface depth.

9. The system of claim 8, wherein the flexible grid comprises an open mesh connecting the series of sparger elements together and maintaining their relative positioning, the open mesh being formed of a diagonally crossed network of polymer straps that define diamond-shaped openings having a larger dimension of between about 1-4 inches.

10. The system of claim 8, wherein the system comprises a plurality of separate identical segments connected together, each segment having a primary air feeder line that extends longitudinally along one lateral side of the segment and has a flexible connection to another primary air feeder line on adjacent segment(s), and wherein each of the segments further includes at least one secondary air feeder line extending laterally across the width of the segment and being in fluid communication with each of the sparger elements that are oriented longitudinally.

11. The system of claim 10, wherein the flexible grid in each segment further includes an open mesh connecting the series of sparger elements together and maintaining the relative positioning of the sparger elements, primary air feeder line, and secondary air feeder line.

12. The system of claim 10, wherein the longitudinally oriented sparger elements are spaced about 3-6 inches apart.

13. The system of claim 10, wherein the segments are flexible and wound about a spool prior to deployment.

14. The system of claim 13, wherein the spool includes an airflow inlet along its axis for communicating with the primary air feeder lines of the connected segments.

15. The system of claim 8, wherein the plurality of sparger elements are spaced in parallel at least 30 cm apart from each other.

16. A wide area bubble plume system for controlling oil floating on a surface of a body of water, comprising:
(i) a bubble distributor including at least two sparger elements each formed of a tube defining a lumen and made of flexible, porous, resistive material that when submerged requires a lumen pressure greater than an exterior pressure before gas will transit through the tube wall from the lumen to the exterior, the at least two sparger elements being connected together to remain spaced apart in parallel and form a flexible flat segment that may undulate in ocean waves, a plurality of separate identical segments being flexibly connected together at adjacent longitudinal ends and each having a primary air feeder line in fluid communication with primary air feeder line(s) of the adjacent segment(s), and weights and buoyant members connected to the flexible segments and adapted to maintain the bubble distributor subsurface.

17. The system of claim 16, wherein the primary air feeder line of each segment extends longitudinally along one lateral side of the segment and has a flexible connection to another primary air feeder line on adjacent segment(s), and wherein each of the segments further includes at least one secondary air feeder line extending laterally across the width of the segment and being in fluid communication with each of the sparger elements that are oriented longitudinally.

18. The system of claim 17, wherein each segment further includes an open mesh connecting the series of sparger elements together and maintaining the relative positioning of the sparger elements, primary air feeder line, and secondary air feeder line.

19. The system of claim 17, wherein the longitudinally oriented sparger elements are spaced about 3-6 inches apart.

20. The system of claim 17, wherein the segments are flexible and wound about a spool prior to deployment.

\* \* \* \* \*